May 6, 1958 K. WASNER 2,833,180
OBJECT PROTECTING DEVICE FOR THE AUTOMATIC
PREFOCUSSING OF MICROSCOPES
Filed Dec. 4, 1953 3 Sheets-Sheet 1
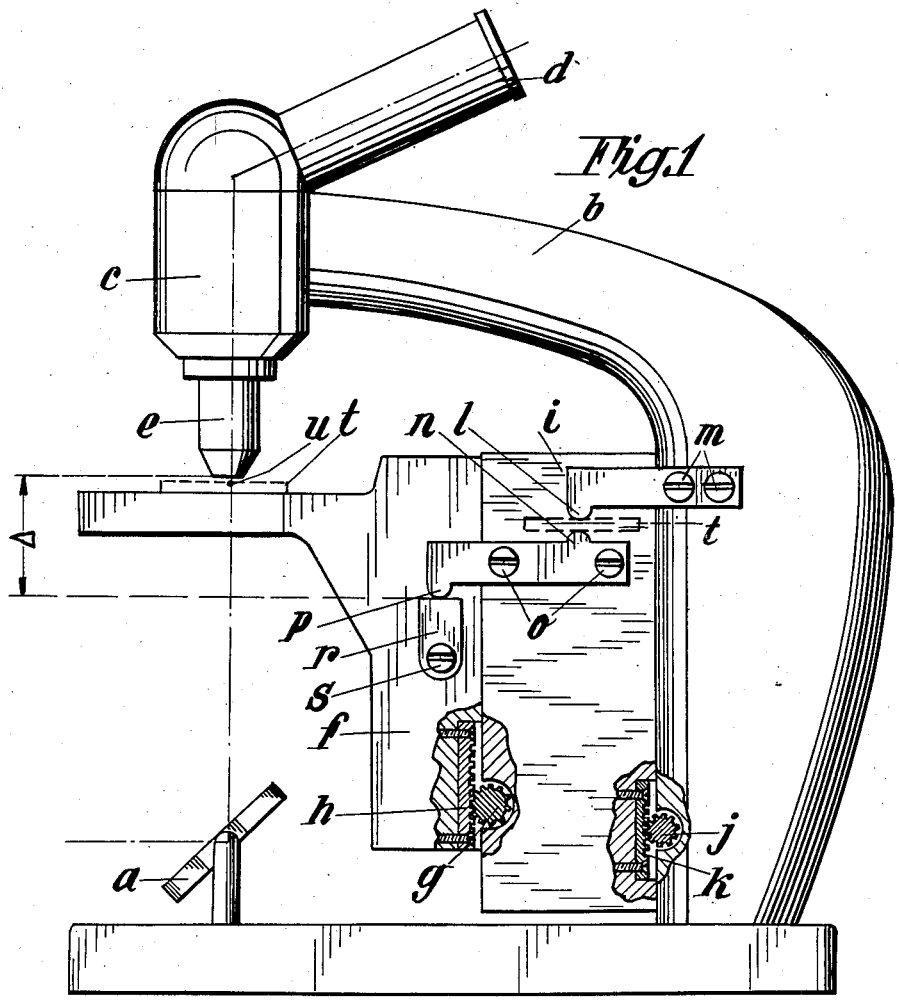
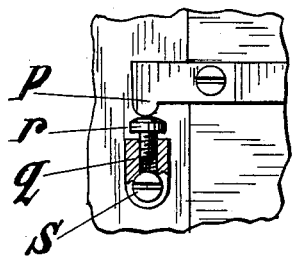
INVENTOR.
KARL WASNER

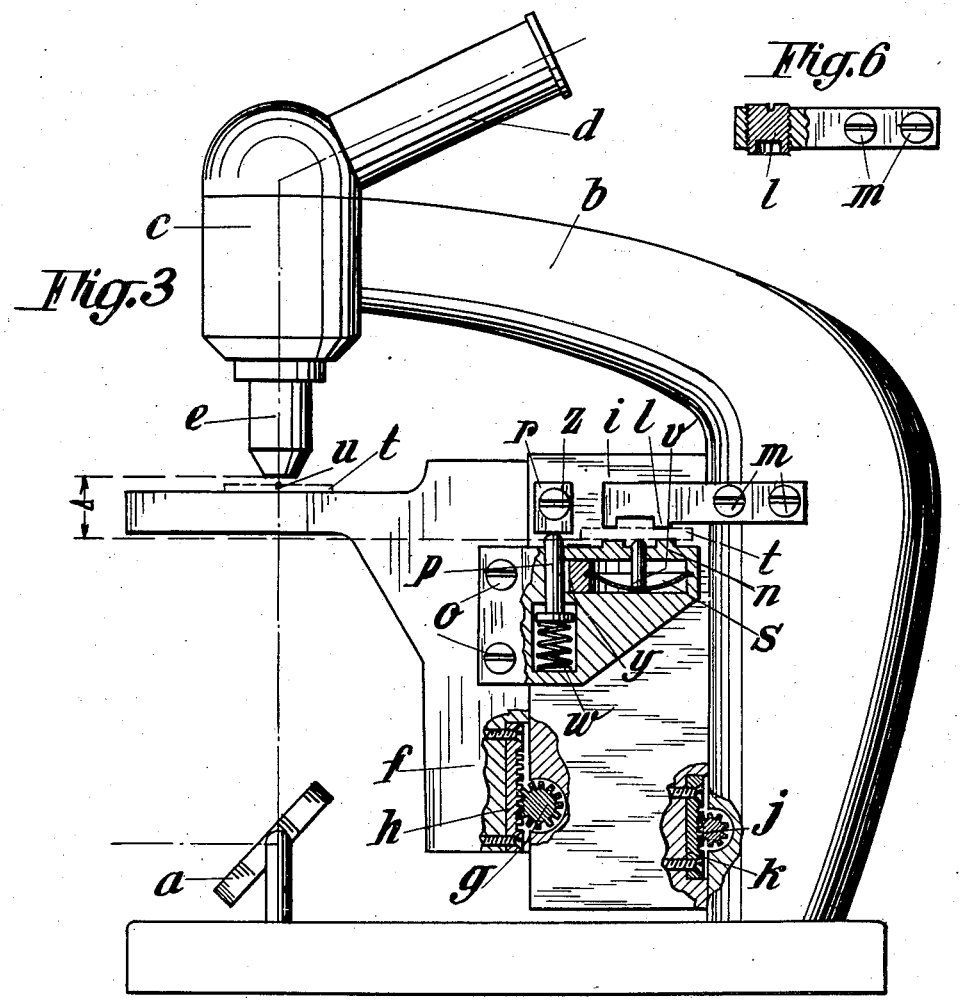
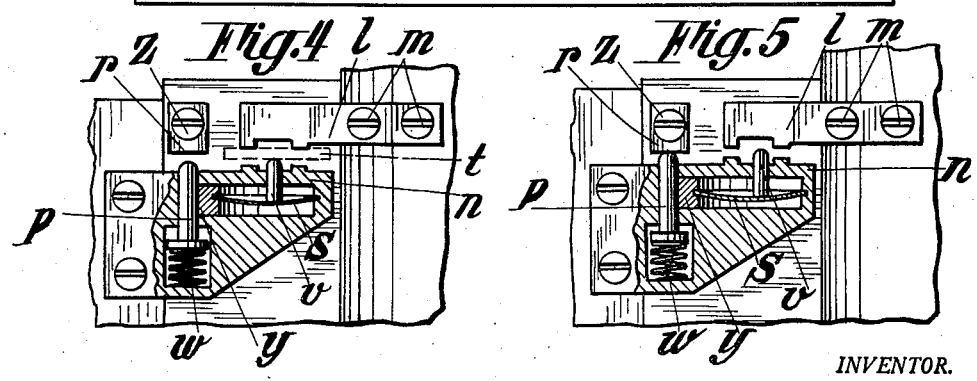

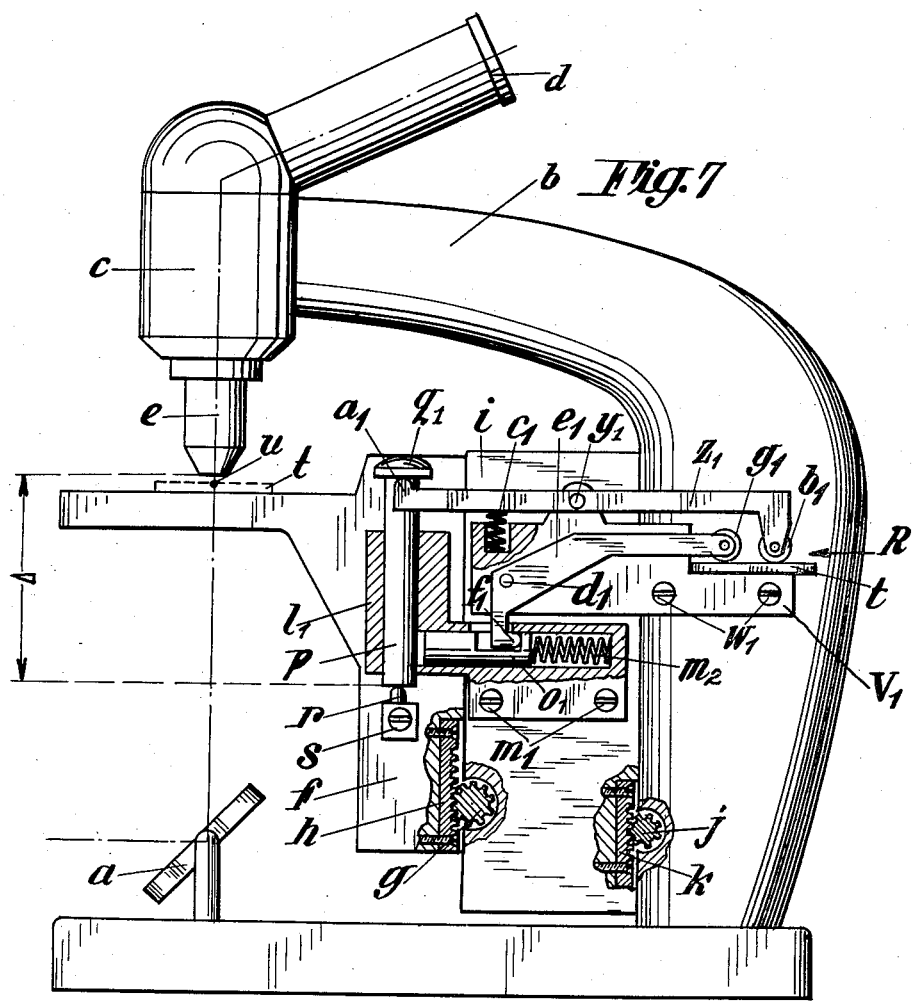

United States Patent Office 2,833,180
Patented May 6, 1958

2,833,180

OBJECT PROTECTING DEVICE FOR THE AUTOMATIC PREFOCUSSING OF MICROSCOPES

Karl Wasner, Vienna, Austria, assignor to Fa. Optische Werke C. Reichert Aktiengesellschaft, Vienna, Austria Application December 4, 1953, Serial No. 396,141

Claims priority, application Austria December 9, 1952

19 Claims. (Cl. 88—39)

It is generally known that in the operation of a microscope the first coarse adjustment of the microscopic image (prefocussing) is obtained with difficulty because it requires a careful actuation of coarse adjusting members to reduce the initially large distance between the object and objective until the object plane almost coincides with the front focal plane of the objective.

That desired condition can be recognized only from the more or less quick appearance of the microscopic image in the eyepiece or, in the case of microprojection, on the screen.

When the object is of low contrast and the objective used of short focal length, particularly high skill and concentration are required on the part of the operator to avoid overlooking the short-time appearance of the microscopic image in the eyepiece during the actuation of the coarse adjustment because upon the slightest continuation of the coarse adjusting movement the image will disappear immediately and the operator will unintentionally cause the collision of the object with the objective.

In dependence on the force of that collision the object or objective is in danger of being damaged.

The present invention has as its object to avoid the trouble and insecurity in the coarse adjustment of the image and to prevent the collision of the object with the objective.

A device is known (Bausch and Lomb, U. S. A.), which facilitates the coarse adjustment of a microscope. In that known device the thickness of the slide is gauged by an actuation of the coarse adjustment provided at the microscope, before the object is applied on the stage of the microscope.

Thereby the objective of the microscope is located at such a distance from the surface of the microscope stage that after the gauged slide has been inserted between the stage and objective the object plane lies approximately in the front focal plane of the objective.

A severe disadvantage of that device, however, resides in the fact that after gauging the slide the coarse adjustment of the microscope must no longer be actuated for initially providing a larger distance between the stage and objective for the usual convenient application or fixation of the slide on the stage. Such operation would eliminate the coarse adjustment effected by gauging the slide.

For this reason that device necessitates a sliding insertion of the slide into the narrow gap between stage and objective for a miscroscopic observation of the object thereon.

Since in the case of short-focus objectives, which are known to have focal distances of only tenths of a millimeter, that sliding insertion must be effected with the utmost caution to avoid damage to the front lens of the objective by the sharp edge of the slide, the advantage of an easier coarse adjustment of the image is obtained with that device only at the expense of an inevitable severe disadvantage in the subsequent operation.

The use of that device is entirely impossible, however, for the examination of permanent slide objects. In these the slide has mostly applied thereon around the object proper a protective ring of lacquer the height of which exceeds the focal distance of short-focus objectives.

Another disadvantage of that known device results from the following facts:

When using short-focus immersion lens objectives the short focal distance between the object and the front lens of the objective must be filled with an optically homogenizing liquid, the immersion oil, so that no air bubbles clouding the microscopic image are formed in the thin oil layer.

It is obvious that during the sliding insertion of the slide necessitated by that device the droplet of oil applied to the slide will be held back and pushed aside at the objective; this makes a detrimental formation of air bubbles in the thin oil layer almost inevitable.

Another disadvantage of that known device resides in the fact that the chance position of the fine adjusting screw on the microscope, which position is independent of the coarse adjusting screw used for gauging the thickness of the slide, also varies the distance between the stage and objective and may enter as a source of considerable error into the intended automatic prefocussing of the microscope.

Another device, known for a long time already, is used only for the protection of the object and objective.

It does not prevent the collision of the object with the objective but merely reduces the force of that collision to a minimum to avoid damage to the object or objective.

To this end the objective is constructed in such a manner that upon collision with the object the lens system proper of the objective is pushed back axially against the resistance of a small spring force into a tube part enclosing the lens system.

The disadvantage of that known device does not reside in functional aspects but in the relatively high costs of manufacture since the slidable arrangement of the lens system of short-focus objectives, which are particularly delicate in respect of precise centering, necssitates very close manufacturing tolerances.

In selling, larger costs are incurred owing to the fact that that known device is not a part of the stage, as in the case of the present invention, but of the objective. Since a microscope stand mostly must be equipped with several short-focus objectives, the costs of manufacture enter several times into the sales price of the total equipment of the microscope.

The present invention is free of all the said disadvantages of the known devices. It avoids on the one hand the trouble and insecurity involved in the coarse adjustment of the microscopic image and on the other hand the collision of the objective with the object.

The following characteristics are essential features of the invention:

(1) It is an object-protecting device for the automatic prefocussing of microscopes, characterized in that for limiting the coarse adjusting movement there are provided a fixed stop and opposite the same an adjustable stop, which is set automatically for the different thicknesses of the slides by the gauge members of a gauge unit.

(2) In use this device does not restrict in any way the usual convenient application of all other adjustments and operations of the microscope.

(3) In addition, the device protects the object and objective.

(4) On principle this device can be used in microscopes whose adjusting movements act as usual either on the stage or the microscope tube or an objective mount.

Hereinafter three illustrative embodiments of the invention are described, and shown in Figs. 1 to 7.

In a diagrammatic, partly sectional side elevation Figs. 1–2 show the first illustrative embodiment of the device fixed to a usual microscope with stage adjustment. It is illustrated here how the adjustable stop, characterizing the invention, for the coarse adjustment of the microscope, is set automatically for the different thicknesses of the slides by the gauge member of a gauge unit, which gauge member is moved, e. g., by the fine adjusting pinion of the microscope.

Figs. 3–6 show in a second illustrative embodiment of the invention how the adjustable stop, characterizing the invention, for the coarse adjustment of the microscope, is set automatically for the different thicknesses of the slides by the gauge member of a gauge unit, which gauge member is moved, e. g., by the coarse adjusting pinion of the microscope.

Fig. 7 shows in a third illustrative embodiment of the device how the adjustable stop, characterizing the invention, for the coarse adjustment of the microscope, is set for the different thicknesses of the slides by the gauge members of a gauge unit, without a necessity of operating the gauge members by an adjusting pinion provided at the microscope.

From all three illustrative embodiments of the invention it is apparent that after the thickness of the slide has been gauged the coarse adjusting movement of the microscope may be actuated to provide initially between the stage and objective a larger distance for the usual advantageous and convenient application of the slide on the stage.

Figs. 1–2.—First illustrative embodiment

The non-inventive parts of the microscope which are stationary and do not participate in the adjusting movements are:

The illuminating mirror $a$, the stand $b$, the tube $c$, the eyepiece $d$, the objective $e$.

The non-inventive parts of the microscope which are movable and participate in the adjusting movements are:

The stage $f$, which by means of the coarse adjusting pinion $g$ and the rack $h$ is vertically adjustable in a dovetail groove (not shown) in the guide member $i$, whereby the distance between stage $f$ and objective $e$ may be coarsely adjusted.

The guide member $i$ may be finely adjusted vertically in a dovetail groove (not shown) in the stand $b$ by means of the fine adjusting pinion $j$.

Upon actuation of the fine adjusting pinion $j$ the fine adjust rack $k$ and the parts $i, g, h$ and $f$ connected thereto are moved vertically, whereby the distance between stage $f$ and objective $e$ is finely adjusted. To simplify the drawing the transmission of that fine adjustment has been symbolized only by the fine rack $k$, different from the usual complicated designs.

The parts of the device according to the invention fixed to that conventional microscope are:

The stationary gauge member $l$, which is fixed with screws $m$ to stand $b$.

The adjustable gauge member $n$, which at its overhanging end carries the adjustable stop $p$ characterizing the invention, is fixed to the guide member $i$ of the microscope with screws $o$.

When by an actuation of the fine adjusting pinion $j$ the adjustable gauge member $n$ is approached to the stationary gauge member $l$ until a slide $t$ inserted between $l$ and $n$ finally contacts $l$ and $n$, then the stop $p$ connected to the adjustable gauge member will be spaced vertically from the stationary objective $e$ by the distance $\Delta$, which depends on the thickness of slide $t$.

In respect of its level the stop $r$ is fixed by screw $s$ once and for all to stage $f$ in such a manner (basic adjustment) that an object $u$ on slide $t$ will be in the focal plane of objective $e$ when previously the thickness of that slide $t$ has been gauged by $l$ and $n$ in the manner described and stage $f$ has been lifted until $r$ abuts $p$.

To facilitate that basic adjustment one of gauge members $l$ or $n$ or one of stops $p$ or $r$ may be adjustably constructed.

Fig. 2 shows, e. g., that stop $r$ is formed to this end as an adjusting screw, which is disposed in a nut portion $q$ fixed with screw $s$ to stage $f$.

The basic adjustment may be selected as desired in such a manner that after the use of the device the object $u$ will be disposed either accurately in or slightly above or below the focal plane of objective $e$.

For uniform contact pressure during the gauging of a slide $t$ by gauge members $l$ and $n$ an actuating knob (not shown) for driving the fine adjusting pinion $j$ may be provided with a friction coupling similar to the generally known friction thimbles in micrometer gauges.

Upon operation of the device, the several parts thereof function as follows:

First the slide $t$ to be used is inserted between gauge member $l$ and $n$.

Then the fine adjusting pinion $j$ is turned clockwise until the upward movement of the fine adjusting rack $k$ and guide member $i$ with the gauge member $n$ affixed thereto causes the latter and the stationary gauge member $l$ to contact slide $t$.

Thus the adjustable stop $p$, which has followed the movement of the gauge member $n$, has been adjusted automatically to that vertical distance $\Delta$ from objective $e$ which is necessary for the upper limitation of the coarse adjusting movement of stage $f$ by stop $r$ and is dependent on the thickness of slide $t$.

Then slide $t$ is withdrawn from the device and placed on stage $f$, which previously has been lowered by the coarse adjusting pinion $g$.

Then stage $f$ is raised by an actuation of the coarse adjusting pinion $g$ until the fixed stop $r$ abuts the adjustable stop $p$, which has been set automatically by gauging the slide $t$.

Then the object $u$ will be disposed automatically in the focal plane of objective $e$ with an accuracy which is sufficient for the coarse adjustment of the microscopic image.

When thereafter, e. g., an object $u$ on a slide $t$ thinner by the amount $x$ (not shown in the figure) is to be brought into the focal plane of objective $e$, that thinner slide $t$ will be gauged so that the adjustable stop $p$ is raised automatically by the same amount $x$ whereby the distance $\Delta$ will be reduced by the same amount $x$.

After that thinner slide $t$ has been placed on stage $f$ and the latter has been raised by an actuation of coarse adjusting pinion $g$ until $r$ abuts $p$, then that object too will be disposed automatically in the focal plane of objective $e$.

From Fig. 1 it is apparent that for the usual convenient application or fixation of slide $t$ on stage $f$ the latter may be lowered at any time by an actuation of the coarse adjusting pinion $g$.

Whenever stage $f$ is raised again until stop $r$ fixed to it abuts the adjustable stop $p$ automatically set by the gauging of $t$, the object $u$ will be in the focal plane of objective $e$ again.

Since upon actuation of the coarse adjusting pinion $g$ the object $u$ can never contact the objective $e$, owing to stops $r$ and $p$, this device additionally protects the object and objective.

For the user of this device, therefore, the troublesome and insecure search for the correct coarse adjustment of the microscopic image during the strenuous observation through the eyepiece of the microscope is eliminated entirely.

The attendance is restricted to the following operations, which can be performed easily and quickly even by unskilled operators:

Gauging, application, and turning an adjusting pinion to the stop.

Then the microscopic image is coarsely adjusted automatically without any view through the eyepiece at all.

Figs. 3-6.—Second illustrative embodiment

Whereas the same designations are used as in Fig. 1 for the usual parts of a microscope, the parts of the second illustrative embodiment of the device fixed to that microscope are designated as follows:

The stationary gauge member $l$ is fixed to stand $b$ with screws $m$.

The adjustable gauge member $n$ is fixed with screws $o$ to stage $f$, vertically adjustable by an actuation of the coarse adjusting pinion $g$ and rack $h$.

The adjustable gauge member $n$ has mounted thereto in a horizontal bore a slidable brake jaw $y$, which holds the stop $p$, characterizing the invention, by the strong spring force of a flat leaf spring $s$ stressed by a slight deflection. That position is shown in Fig. 4.

When by a depression of the feeler pin $v$ the leaf spring $s$ is more strongly deflected, the original distance between the ends of the leaf spring is shortened whereby the high brake pressure exercised by brake jaw $y$ on the adjustable stop $p$ is eliminated. Then the weak compression spring $w$ can lift the adjustable stop $p$ until it contacts the fixed stop $r$, which is fixed to the guide member $i$ of the microscope by means of the screw $z$. That position is shown in Fig. 3.

In respect of its vertical position the stationary gauge member $l$ is fixed to stand $b$ in such a manner (basic adjustment) that an object $u$ on slide $t$ will be disposed in the focal plane of objective $e$ when previously the thickness of that slide $t$ has been gauged by gauge members $l$ and $n$ and stage $f$ has been raised until $p$ abuts $r$.

To facilitate that basic adjustment the gauge member $l$ may be adjustably constructed, as shown in Fig. 6.

Upon operation of this device the several parts thereof function as follows:

First the slide $t$ is inserted between gauge members $l$ and $n$.

Then the coarse adjusting pinion $g$ is turned clockwise to raise the adjustable gauge member $n$, which is driven by rack $h$ and stage $f$.

During that upward movement of gauge member $n$, the feeler pin $v$ first contacts the underside of slide $t$ (see Fig. 4).

As the upward movement of $n$ continues, the feeler pin $v$ owing to the resistance encountered at slide $t$ is urged against leaf spring $s$, which is deflected more strongly. Upon that deflection the brake pressure of brake jaw $y$ against the adjustable stop $p$ is eliminated, as has been described.

When during the upward movement of the movable gauge member $n$ the latter and the stationary gauge member $l$ finally contact the slide $t$ (Fig. 3), the upward movement is terminated and slide $t$ is withdrawn from the device.

By that withdrawal of slide $t$ the feeler pin $v$ is set free to move upwardly (see Fig. 5) and the more strongly deflected leaf spring $s$ springs back into its more extended position, whereby brake jaw $y$ is urged with great force at right angles against the adjustable stop $p$ contacting the fixed stop $r$. Now brake jaw $y$ holds the adjustable stop $p$ in that position.

Finally it is apparent from Fig. 3 that when slide $t$ is gauged the adjustable gauge member $n$ is at a vertical distance $\Delta$ from objective $e$, which distance depends on the thickness of slide $t$, and that at the same time the adjustable stop $p$ contacts the fixed stop $r$.

Since shortly thereafter, by the withdrawal of slide $t$, the adjustable stop $p$ is braked fast in that position (Fig. 5), stage $f$ may be lowered by an actuation of the coarse adjusting pinion $g$, for a convenient application of the gauged slide $t$.

When $f$ is then raised again until $p$ contacts $r$, then the vertical distance $\Delta$ will be reestablished and the object $u$ will be disposed automatically in the focal plane of objective $e$.

Since upon an actuation of the coarse adjusting pinion $g$ the object $u$ owing to stops $p$ and $r$ cannot contact the objective, this device at the same time protects the object and objective.

Fig. 7.—Third illustrative embodiment

Whereas the same designations are used as in Fig. 1 for the usual parts of a microscope with stage adjustment, the parts of the third illustrated embodiment of the device affixed thereto are designated as follows:

The angular bracket $l_1$ (partly shown in section) is fixed with screws $m_1$ to the guide member $i$ of the microscope.

In a horizontal bore of bracket $l_1$ a brake jaw $o_1$ is slidably mounted against a compression spring $m_2$.

In a vertical bore of bracket $l_1$ the adjustable stop $p$ characterizing the invention is easily displaceably arranged; at its upper end that stop is formed as an annular abutment $q_1$.

A fixed stop $r$ is fixed with screw $s$ to stage $f$. That stop $r$ may be adjustably constructed to facilitate a basic adjustment (as shown in Fig. 2).

The stationary gauge member $v_1$ is fixed with screws $w_1$ to stand $b$ and is provided with a pivot $v_1$ on which a lever $z_1$ having equal arms, is rotatably mounted. One end of that lever forms a stop $a_1$, the other end carries the gauge roller $b_1$. Lever $z_1$ is permanently raised on one side by compression spring $c_1$ so that gauge roller $b_1$ is in close contact with any slide $t$ which may be inserted between $v_1$ and $b_1$.

The stationary gauge member $v_1$ is further provided with a brake lever $e_1$ which has unequal arms and is rotatably mounted on pivot $d_1$. The end of the short arm of $e_1$ forms a thrust member $f_1$, the end of the long arm carries the gauge roller $g_1$.

Upon operation of the device the several parts thereof function as follows:

Firstly the coarse adjusting pinion $g$ is actuated to lower the stage $f$ until sufficient space is available between stage $f$ and objective $e$ for the subsequent convenient application of slide $t$. Thereby the fixed stop $r$ is first spaced from the adjustable stop $p$. Then the slide $t$ to be used is introduced in the direction R between the flat face of the stationary gauge member $v_1$ and the two gauge rollers $b_1$ and $g_1$.

Thereby the gauge rollers $b_1$ and $g_1$ are lifted one shortly after the other to initiate the following operations:

First the gauge roller $b_1$ is lifted by the amount of the thickness of slide $t$. Since lever $z_1$ has equal arms, stop $a_1$ will be lowered by an equal amount, the compression spring $c_1$ providing for a close contact between $v$, $t$ and $b_1$. Shortly afterwards the gauge roller $g_1$ is lifted by slide $t$, whereby the thrust member $f_1$ on the short arm of brake lever $e_1$ pushes back the brake jaw $o_1$ against the action of compression spring $m_2$. The adjustable stop $p$, which is no longer held now by the brake jaw $o_1$, drops by gravity until its abutment $q_i$ contacts the stop $a_1$, which is adjusted to a level corresponding to the thickness of slide $t$.

Now slide $t$ is withdrawn from the device in the opposite direction R. Gauge roller $g_1$ loses contact with slide $t$, whereby thrust member $f_1$ permits the force of the strong compression spring $m_2$ to act through brake jaw $o_1$ on the adjustable stop $p$.

The adjustable stop $p$, whose vertical distance $\Delta$ from objective $e$ has been adjusted automatically now in dependence of the thickness of slide $t$, is then held in that position by brake jaw $o_1$ with great force.

After the gauged slide $t$ has been applied on stage $f$ and the latter has been raised by an actuation of the coarse adjusting pinion $g$ until stop $r$ abuts the adjusted stop $p$, the object $u$ will be disposed automatically in the focal plane of objective $e$.

Since during the actuation of the coarse adjusting pinion $g$ the object $u$ owing to stops $r$ and $p$ can never contact the objective e, that device at the same time protects the object and objective.

The slide is gauged by the gauge members of the devices always at a part rather close to the edge at the narrow side of the slide.

At the center of the slide, the small, thin object is arranged, which in practice is protected by a small cover glass only about 0.17 mm. thick. The thickness variations of these cover glasses, amounting to only a few hundredths of a millimeter, are optically insignificant for prefocussing. For clearer showing these cover glasses are not shown in the drawings.

I claim:

1. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to enter into operative association with said first stop means while a slide member or the like the thickness of which is to be compensated for is in engagement with at least one of said stop means; third stop means on the other of said support means; and fourth stop means on said one support means and adapted to engage said third stop means.

2. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to enter into operative association with said first stop means while a slide member or the like the thickness of which is to be compensated for is in engagement with at least one of said stop means; third stop means on the other of said support means; fourth stop means mounted on said one support means for movement toward and away from said third stop means, adapted to engage the same and being permanently urged toward the same; and retaining means for holding said fourth stop means in that position thereof which it assumes when said second stop means cooperates with said first stop means.

3. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to engage a slide member or the like while the same is interposed between said first and second stop means; third stop means on the other of said support means; and fourth stop means on said one support means and adapted to engage said third stop means.

4. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to engage a slide member or the like while the same is interposed between said first and second stop means; third stop means on the other of said support means; fourth stop means mounted on said one support means for movement toward and away from said third stop means, adapted to engage the same and being permanently urged toward the same; and retaining means for holding said fourth stop means in that position thereof which it assumes when said second stop means engages the slide member or the like while the same is interposed between said first and second stop means.

5. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on said first support means and adapted to enter into operative association with said first stop means while a slide member or the like the thickness of which is to be compensated for is in engagement with at least one of said stop means; third stop means on said second support means; and fourth stop means on said first support means and adapted to engage said third stop means.

6. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on said first support means and adapted to engage a slide member or the like while the same is interposed between said first and second stop means; third stop means on said second support means; and fourth stop means on said first support means and adapted to engage said third stop means.

7. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on said first support means and adapted to enter into operative association with said first stop means while a slide member or the like the thickness of which is to be compensated for is in engagement with at least one of said stop means; third stop means on said second support means; fourth stop means mounted on said first support means for movement toward and away from said third stop means, adapted to engage the same and being permanently urged toward the same; and retaining means for holding said fourth stop means in that position thereof which it assumes when said second stop means is in operative association with said first stop means.

8. The combination defined in claim 7 wherein said fourth stop means is gravity-biased toward said third stop means.

9. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on said second support means and adapted to enter into operative association with said first stop means while a slide member or the like the thickness of which is to be compensated for is in engagement with at least one of said stop means; third stop means on said first support means; and fourth stop means on said second support means and adapted to engage said third stop means.

10. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on said second support means and adapted to engage a slide member or the like while the same is interposed between said first and second stop means; third stop means on said first support means; fourth stop means mounted on said second support means for movement toward and away from said third stop means, adapted to engage the same and being permanently urged toward the same; and retaining means for holding said fourth stop means in that position thereof which it assumes when said second stop means engages the slide member or the like while the same is interposed between said first and second stop means.

11. The combination defined in claim 10 wherein said fourth stop means is spring-biased toward said third stop means.

12. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to enter into operative association with said first stop means while a slide member or the like the thickness of which is to be compensated for is interposed between said first and second stop means; third stop means on the other of said support means; fourth stop means mounted on said one support means for movement toward and away from said third stop means, adapted to engage the same and being permanently urged toward the same; and retaining means connected to said second stop means and actuated thereby for holding said fourth stop means in that position thereof which it assumes when said second stop means is in operative association with said first stop means while the slide member or the like is interposed between said first and second stop means.

13. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to enter into operative association with said first stop means while a slide member or the like the thickness of which is to be compensated for is interposed between said first and second stop means; third stop means on the other of said support means; fourth stop means mounted on said one support means for movement toward and away from said third stop means, adapted to engage the same and being permanently urged toward the same; and retaining means connected to said second stop means and actuated thereby for holding said fourth stop means in that position thereof which it assumes when said second stop means is in operative association with said first stop means while the slide member or the like is interposed between said first and second stop means, said retaining means including a brake member mounted for movement toward and away from said fourth stop means, biasing means for biasing said brake member toward said fourth stop means so that said brake member engages said fourth stop means and prevents movement thereof relative to said third stop means, and moving means connected to said second stop means for decreasing the action of said biasing means when said second stop means cooperates with said first stop means thereby causing said brake member to permit movement of said fourth stop means toward said third stop means under the action of the force permanently urging said fourth stop means toward said third stop means.

14. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to engage a slide member or the like while the same is interposed between said first and second stop means; third stop means on the other of said support means; fourth stop means mounted on said one support means for movement toward and away from said third stop means, adapted to engage the same and being permanently urged toward the same; and retaining means connected to said second stop means and actuated thereby for holding said fourth stop means in that position thereof which it assumes when said second stop means engages the slide member or the like while the same is interposed between said first and second stop means, said retaining means including a brake member mounted for movement toward and away from said fourth stop means, said brake member being permanently urged toward said fourth stop means so as to engage the same and prevent movement thereof relative to said third stop means, and moving means connected to said second stop means for moving said brake member away from said fourth stop means against the action of the force permanently urging said brake member toward said fourth stop means when said second stop means engages the slide member or the like while the same is interposed between said first and second stop means thereby causing said brake member to permit movement of said fourth stop means toward said third stop means under the action of the force permanently urging said fourth stop means toward said third stop means.

15. The combination defined in claim 14 wherein said fourth stop means is spring-biased toward said third stop means and said brake member is spring-biased toward said fourth stop means.

16. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; first stop means on said stand; second stop means on one of said support means and adapted to enter into operative association with said first stop means while a slide member or the like the thickness of which is to be compensated for is in engagement with at least one of said stop means; third stop means on the other of said support means; fourth stop means mounted on said one support means for movement toward and away from said third stop means, adapted to engage the same and being permanently urged toward the same; and retaining means connected to said first stop means and actuated thereby for holding said fourth stop means in that position thereof which it assumes when said second stop means is in operative association with said first stop means.

17. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; combined primary stop and measuring means on said stand for measuring the thickness of a slide member or the like; secondary stop means on one of said support means; tertiary stop means mounted on the other of said support means for movement toward and away from said secondary stop means, adapted to engage the same and being permanently urged toward the same, said tertiary stop means being further adapted to enter into operative association with said combined primary stop and measuring means while the same measures the thickness of the slide member or the like; and retaining means for holding said tertiary stop means in that position thereof when the same is in operative association with said combined primary stop and measuring means while the latter measures the thickness of the slide member or the like.

18. In a prefocussing arrangement for microscopes or the like, in combination, a stationary stand; first support means mounted on said stand for movement relative thereto in a predetermined direction; second support means mounted on said first support means for movement relative thereto in a direction parallel to said predetermined direction; combined primary stop and measuring means on said stand for measuring the thickness of a slide member or the like; secondary stop means on said second support means; tertiary stop means mounted on said first support means for movement toward and away from said secondary stop means, adapted to engage the same and being permanently urged toward the same, said tertiary stop means being further adapted to enter into operative association with said combined primary stop and measuring means while the same measures the thickness of the slide member or the like; and retaining means for holding said tertiary stop means in that position thereof when the same is in operative association with said combined primary stop and measuring means while the latter measures the thickness of the slide member or the like.

19. The combination defined in claim 18 wherein said tertiary stop means is gravity-biased toward said secondary stop means.

References Cited in the file of this patent

UNITED STATES PATENTS

| | | |
|---|---|---|
| 859,233 | Lane | July 9, 1907 |
| 1,617,722 | Posch | Feb. 15, 1927 |
| 2,166,034 | Allison | July 11, 1939 |
| 2,591,888 | Steffen | Apr. 8, 1952 |
| 2,636,112 | Dvorsky | Apr. 21, 1953 |